United States Patent [19]

Peeples et al.

[11] 4,279,377
[45] Jul. 21, 1981

[54] CARTON WITH SELF-LOCKING TOP AND BOTTOM CLOSURE FLAPS AND BLANK THEREFOR

[75] Inventors: Dick E. Peeples, Capitola; Mervin Lohrbach, Anaheim, both of Calif.

[73] Assignee: Champion International Corporation, Stamford, Conn.

[21] Appl. No.: 94,492

[22] Filed: Nov. 15, 1979

[51] Int. Cl.³ .............................................. B65D 5/10
[52] U.S. Cl. .................................. 229/39 R; 229/41 B
[58] Field of Search .................. 229/39 R, 41 R, 41 B

[56] References Cited

U.S. PATENT DOCUMENTS

| 1,546,601 | 7/1925 | Morris | 229/39 R |
| 2,337,198 | 12/1943 | Holy | 229/39 R |
| 2,361,603 | 10/1944 | Cohen et al. | 229/39 R |
| 2,713,965 | 7/1955 | Acker | 229/39 R |
| 2,779,527 | 1/1957 | Fallert | 229/39 R |
| 2,934,254 | 4/1960 | Ullger | 229/41 B |
| 3,178,096 | 4/1965 | Reeves et al. | 229/41 B X |
| 3,302,853 | 2/1967 | Locke | 229/39 R |
| 3,819,105 | 6/1974 | Heimann | 229/41 B X |

FOREIGN PATENT DOCUMENTS

| 76583 | 6/1948 | Czechoslovakia | 229/39 R |
| 103931 | 3/1966 | Denmark | 229/41 B |

*Primary Examiner*—Davis T. Moorhead
*Attorney, Agent, or Firm*—Evelyn M. Sommer

[57] ABSTRACT

A self-locking, reusable carton, formed from a unitary blank of paperboard, comprising a tubular body portion, a plurality of top closure flaps and a plurality of bottom closure flaps. The top closure flaps include two flaps having L-shaped slits therein and a locking flap having a reduced-width locking tab at the end for reception in the two L-shaped slits. The bottom closure flaps include first and second flaps, each having a set of two L-shaped slits therein, and third and fourth flaps, the third flap being received in one of the slits in the first flap and in one of the slits in the second flap, and the fourth flap being received in the other of the slits in the first flap and in the other of the slits in the second flap.

8 Claims, 9 Drawing Figures

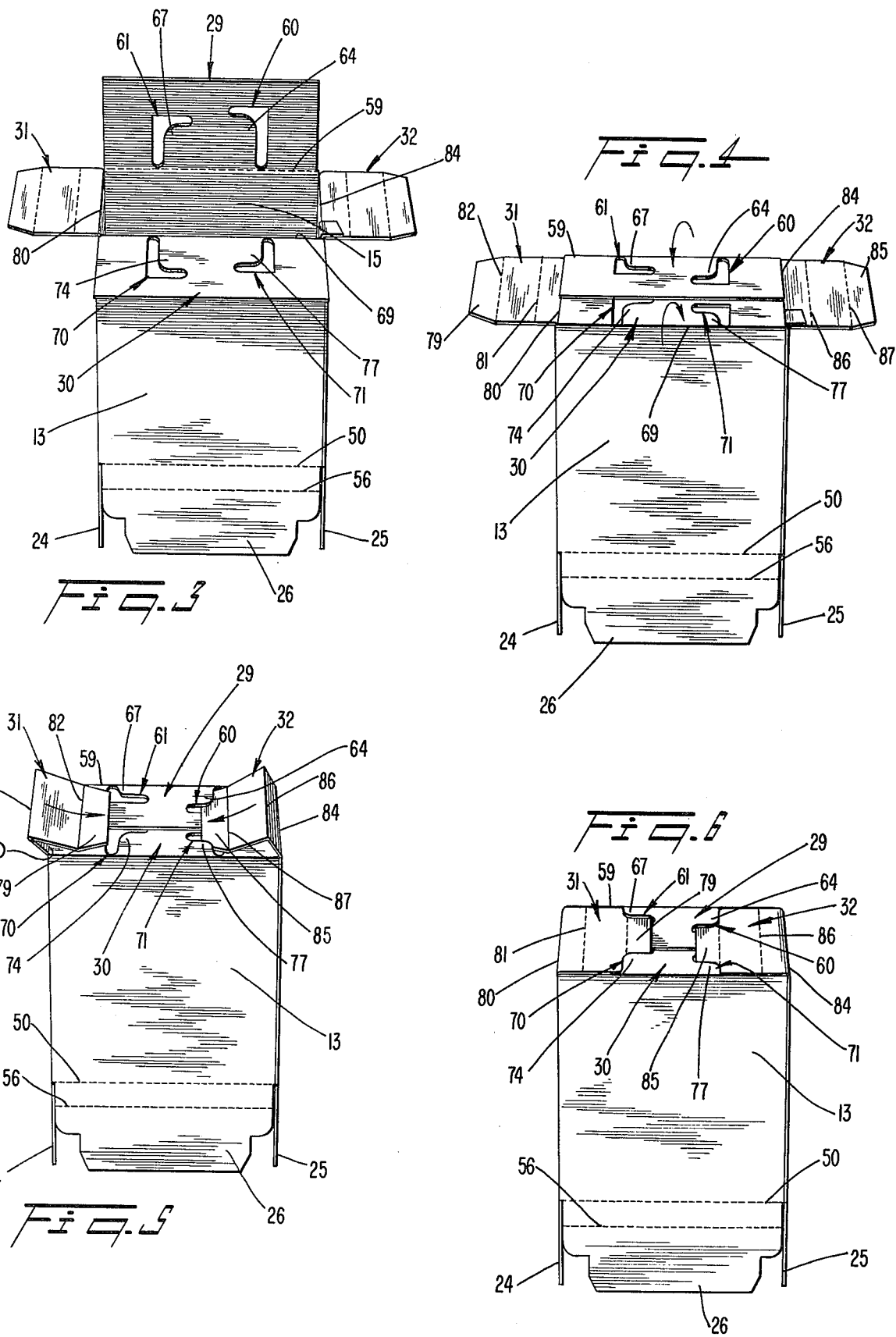

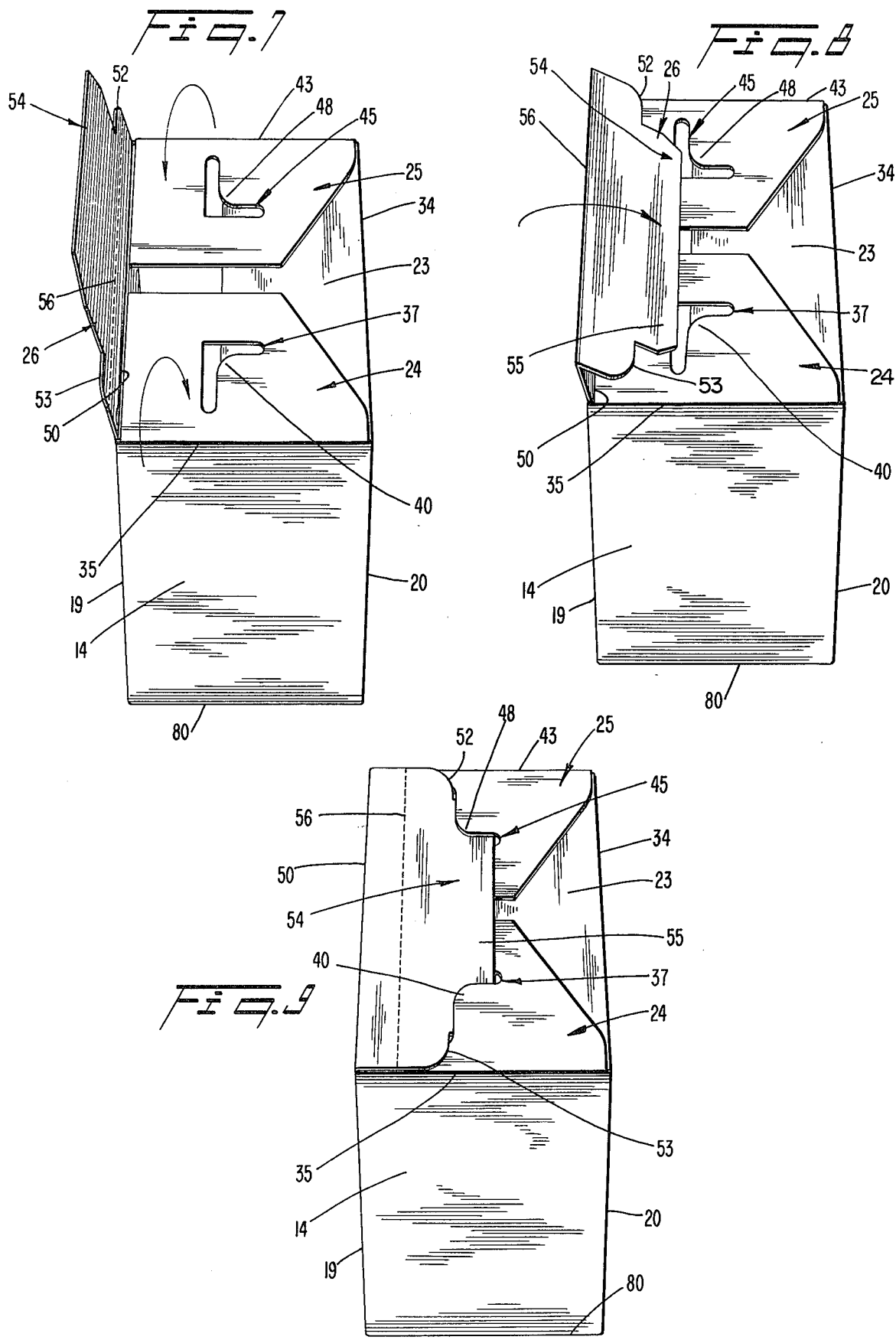

CARTON WITH SELF-LOCKING TOP AND BOTTOM CLOSURE FLAPS AND BLANK THEREFOR

FIELD OF THE INVENTION

The present invention relates to a self-locking, reusable carton formed from a unitary blank of paperboard. A plurality of overlapping top closure flaps interlock to securely close the top of the carton and a plurality of overlapping bottom closure flaps interlock to securely close the bottom of the carton. The locking is accomplished in each case by a plurality of L-shaped slits, located in two of the closure flaps, receiving at least one of the remaining flaps therein.

BACKGROUND OF THE INVENTION

For years, the metal can manufacturing industry has been utilizing a resuable paperboard carton to ship their heavy, metal can ends. Due to the heavy weight of the metal can ends, these cartons have their top and bottom flaps sealed with tape to securely keep the can ends therein. Once the cartons arrive at their destination, they are unpacked by removing the tape from the carton, and these cartons are reshipped back to the can's manufacturer to be reused. However, when the tape is ripped from the carton, it sometimes tears part of the liners from the carton and therefore weakens it. This has an adverse effect on the number of times an individual carton can be reused. In addition, the tape utilized and the labor to apply the tape is rather expensive.

While there have been self-locking cartons designed in the past, they have not been strong enough to hold the weight of the heavy, metal can ends and tend to fall apart.

SUMMARY OF THE INVENTION

Accordingly, it is a primary object of the present invention to provide a self-locking carton and a unitary paperboard blank therefor which is strong enough to contain heavy objects.

Another object of the present invention is to provide such a carton and blank which has a very secure, self-locking construction, thereby eliminating tape, glue or stitching to close the top and bottom of the carton.

Another object of the present invention is to provide such a carton and blank which is reusable and assembly and disassembly thereof will not tear or otherwise damage the carton.

The foregoing objects are basically attained by providing a self-locking carton formed from a unitary paperboard blank comprising a front panel, a first side panel, a rear panel, a second side panel, and a glue flap hingedly coupled in series along parallel fold lines and folded to form a tubular body portion; and four top closure flaps hingedly coupled to the tops of the panels along fold lines and folded perpendicular to the panels in an overlapping configuration, the four top closure flaps comprising a first flap coupled to the rear panel, a second flap coupled to the first side panel and having an aperture therein, a third flap coupled to the second side panel and having an aperture therein and a fourth flap coupled to the front panel and having a locking tab at the end thereof received in the apertures in the second and third flaps. Advantageously, each of the apertures is substantially L-shaped.

The foregoing objects are also basically attained by providing such a series of panels with four bottom closure flaps hingedly coupled to the bottoms of the panels along fold lines and folded perpendicular to the panels in an overlapping configuration, the four bottom closure flaps comprising a first flap coupled to the rear panel and having a first set of two apertures therein, a second flap coupled to the front panel and having a second set of two apertures therein, a third flap coupled to the first side panel and received in one of the apertures in said first set and one of the apertures in the second set, and a fourth flap coupled to the second side panel and received in the other of the apertures in the first set and the other of the apertures in the second set. Advantageously, each of the four apertures is substantially L-shaped.

Other objects, advantages and salient features of the present invention will become apparent from the following detailed description, which, taken in conjunction with the annexed drawings, discloses a preferred embodiment of the present invention.

DRAWINGS

Referring now to the drawings which form a part of this original disclosure:

FIG. 3 is a perspective view of the tubular body portion shown in FIG. 2 which has been inverted and in which one of the bottom closure flaps having a set of apertures therein has been upwardly folded into an upright position;

FIG. 4 is a view similar to that shown in FIG. 3 except that the two bottom closure flaps having the two sets of apertures therein have been folded perpendicular to the main panels forming the tubular body portion and are overlapping one another;

FIG. 5 is a view similar to FIG. 4 except that one of the bottom closure flaps is folded and is partially inserted into apertures in the previously folded bottom closure flaps and the remaining bottom closure flap is about to be received in the remaining apertures;

FIG. 6 is a view similar to that shown in FIG. 5 except that the bottom closure flaps are completely interlocked;

FIG. 7 is a perspective view of the top closure flaps in which the two flaps having apertures therein are folded perpendicular to the tubular body portion;

FIG. 8 is a view similar to that shown in FIG. 7 except that the outermost top closure flap has been folded and is about to be received in the apertures in the previously folded flaps; and FIG. 9 is a view similar to that shown in FIG. 8 except that the top closure flaps are completely interlocked.

DETAILED DESCRIPTION OF THE INVENTION

Figure 1:
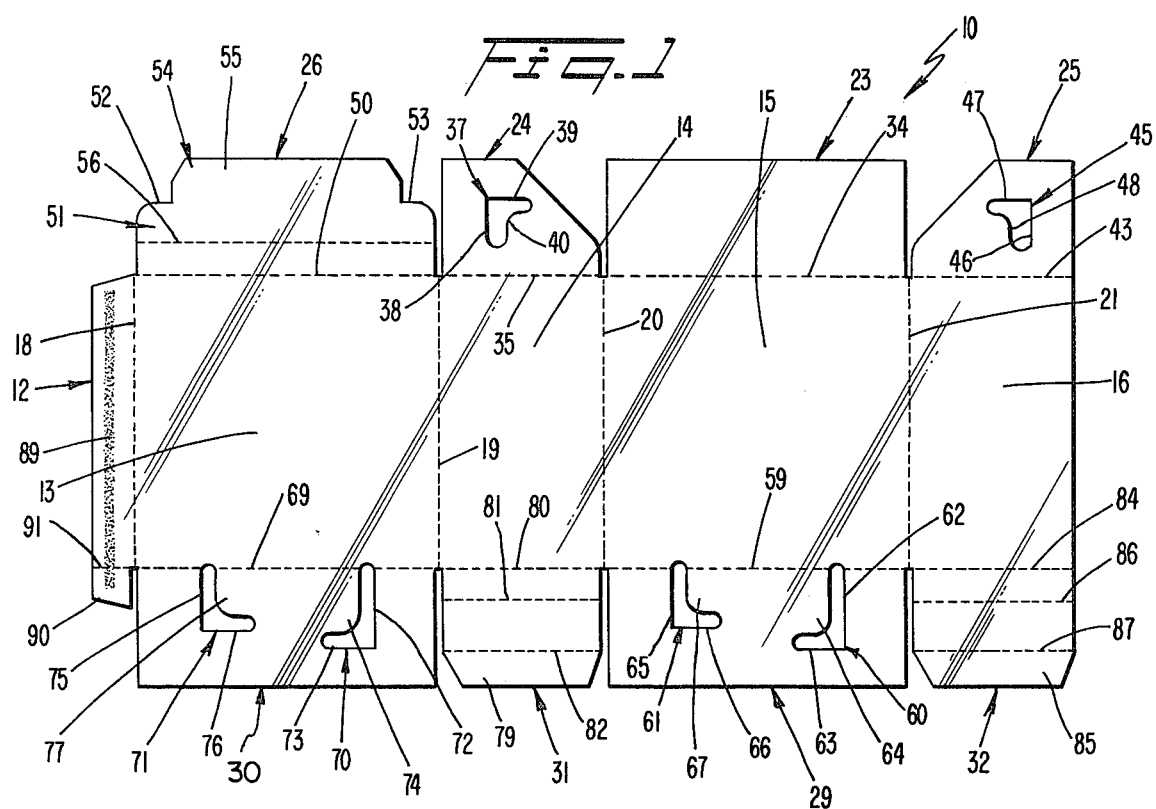
FIG. 1 is a front elevational view of the outside surface of the unitary blank in accordance with the present invention.

Referring now to FIG. 1, the blank 10 in accordance with the present invention is shown comprising a glue flap 12, a front panel 13, a first side panel 14, a rear panel 15, and a second side panel 16, all hingedly coupled in series along generally parallel fold lines 18, 19, 20 and 21, respectively.

The blank 10 further comprises four top closure flaps hingedly coupled along fold lines at the top of the main panels 13–16 including a first top flap 23, a second top flap 24, a third top flap 25 and a fourth top flap 26.

In addition, the blank 10 further comprises four bottom closure flaps hingedly coupled to the bottom of the main panels 13–16 along fold lines including the first bottom flap 29, the second bottom flap 30, the third bottom flap 31 and the fourth bottom flap 32.

The first top flap 23 is rectangular and extends from the rear panel 15 along fold line 34.

The second top flap 24 is substantially in the shape of a right trapezoid and hingedly extends from the first side panel 14 along a fold line 35. Formed in the second top flap 24 is an aperture 37 in the form of a substantially L-shaped slit having a major leg 38 and a minor leg 39, the major leg being longer and wider than the minor leg. These two legs intersect at substantially right angles and define therebetween a substantially L-shaped tab 40. The major leg 38 is substantially perpendicular to the fold line 35 hingedly coupling the second top flap 24 to the first side panel 14. The minor leg 39 faces towards the first top flap 23, as seen clearly in FIG. 1. Preferably, the remote ends of the major and minor legs 38 and 39 are rounded and similarly the substantially L-shaped tab 40 is rounded at the intersection of the major and minor legs.

The third top flap 25 is a mirror image of the second top flap 24 and is hingedly coupled to the second side panel 16 along fold line 43. It has formed therein the substantially L-shaped aperture 45 comprised of a major leg 46 and a minor leg 47, the intersections thereof forming the tab 48.

The fourth top flap 26 is hingedly coupled to the front panel 13 along fold line 50 and comprises a main portion 51 having inwardly directed rounded shoulders 52 and 53 leading to a locking tab 54 having a tapered end portion 55. A transverse fold line 56 extends from one edge to the other of the main portion 51, which fold line is parallel to fold line 50.

Referring now to the bottom closure flaps, the first bottom flap 29 is rectangular and hingedly extends from the bottom of the rear panel 15 along fold line 59. Formed in the first bottom flap 29 are a first set of two apertures 60 and 61 each in the configuration of a substantially L-shaped slit, with the first slit 60 being larger than the second slit 61.

The first slit 60 in flap 29 comprises a first leg 62 and a second leg 63, the first leg 62 being perpendicular to fold line 59 and also perpendicular to the second leg 63. These two legs define in their intersection a rounded substantially L-shaped tab 64. The remote ends of legs 62 and 63 are preferably rounded, the remote end of leg 62 crossing over the fold line 59 a short distance. The second leg 63 extends towards the second slit 61.

The second slit 61 in flap 29 comprises a first leg 65 and a second leg 66, these legs being perpendicular to each other and defining a rounded, substantially L-shaped tab 67 at their intersection. Preferably, the remote ends of the first and second legs 65 and 66 are rounded, the remote end of leg 65 extending a short distance past fold line 59. The first leg 65 is perpendicular to fold line 59 and the second leg 66 extends towards the first slit 60 in flap 29. As seen in FIG. 1, the first leg 62 of the first slit 60 is longer than the first leg 65 of the second slit 61 and leg 63 in the slit 60 is further from fold line 59 than is leg 66 in slit 61.

The second bottom flap 30 hingedly extends from the front panel 13 along fold line 69, is rectangular and has formed therein a second set of two apertures in the form of substantially L-shaped slits, including a first slit 70 and a second slit 71. The overall configuration of the first and second bottom flaps 29 and 30 is the same, as seen in FIG. 1, including the orientation, location and size of the two slits contained in each. Accordingly, the details of the slits in the second bottom flap 30 will not be repeated except to mention that the first slit 70 is comprised of a first leg 72 intersecting with a second leg 73 defining a tab 74. Similarly, the second slit 71 is comprised of a first leg 75 intersecting with a second leg 76 defining therebetween a tab 77.

The third bottom flap 31 is substantially rectangular with a tapered distal end portion 79 and hingedly extends from the first side panel 14 along fold line 80. Two transverse fold lines 81 and 82 are located in the third bottom flap 31 extending from the opposed edges thereof, these fold lines being parallel to fold line 80. Fold line 81 is located downward from fold line 80 about one-quarter the length of flap 31 and fold line 82 is located downward from fold line 80 about three-quarters of the length of flap 31, the tapered distal end portion 79 beginning at fold line 82.

The fourth bottom flap 32 is the same as the third bottom flap 31 in configuration and size and extends hingedly from the second side panel 16 along fold line 84. This flap 32 has a tapering distal end portion 85 and two parallel transverse fold lines 86 and 87 corresponding to those similar parts in flap 31.

As seen in FIG. 1, the glue flap 12 has adhesive 89 thereon, is substantially trapezoidal in shape and has a short end flap 90 at the bottom thereof defined by a fold line 91 which is coincident with fold line 69 between panel 13 and flap 30.

Each of the panels 13, 14, 15 and 16 are substantially rectangular, panels 13 and 15 being of the same size, panels 14 and 16 being of the same size, and panels 14 and 16 being smaller than panels 13 and 15. The fold lines 34, 35, 43 and 50 along which the top closure flaps are hingedly coupled to the main panels are in the same line, as are fold lines 59, 69, 80 and 84 between the bottom flaps and the main panels.

Preferably, the entire blank 10 is formed of thin, foldable paperboard.

CONSTRUCTION OF THE CARTON

Figure 2:
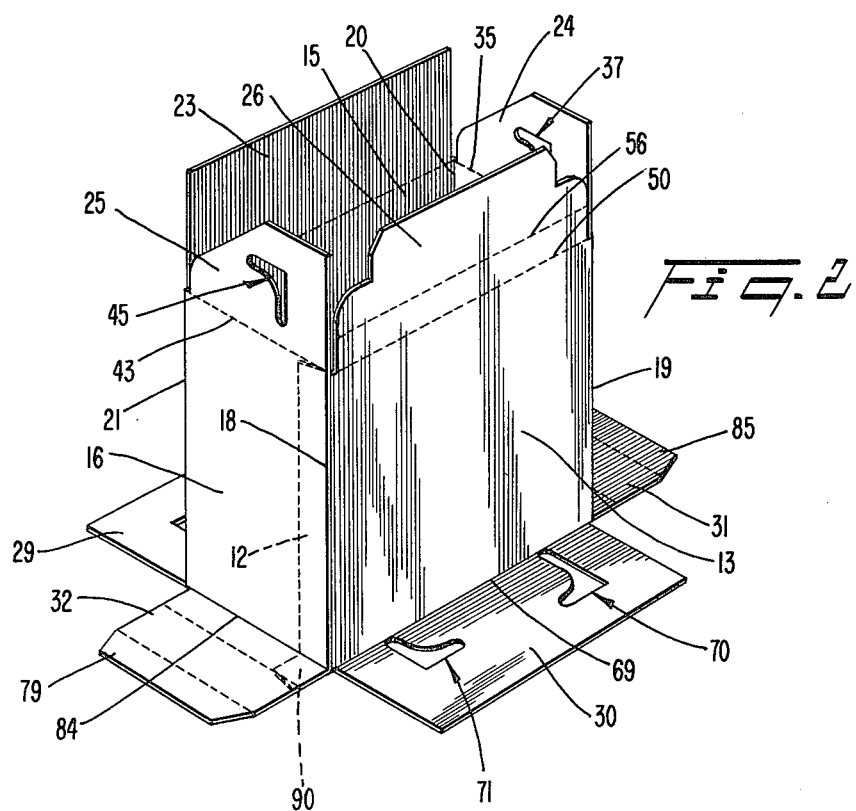
FIG. 2 is a right perspective view of the blank shown in FIG. 1 in which the main panels have been folded to form a tubular body portion.

Referring now to FIG. 2, the blank 10 has been folded so as to form a tubular body portion having a rectangular cross-section. In particular, the various main panels 13, 14, 15 and 16 are folded about fold lines 19, 20 and 21 so as to assume the tubular configuration and the glue flap 12 is folded about fold line 18 so that the adhesive 89 adheres glue flap 12 to the inside of the second side panel 16. In addition, the short end flap 90, having adhesive thereon, is adhered to the inside of the fourth bottom flap 32. Although the bottom flaps 29–32 are seen folded outwardly in FIG. 2, this is basically for simplicity of illustration, such not being required to form the tubular body portion. However, it is advantageous to so fold these bottom flaps as a precursor to locking the bottom flaps together as seen in FIGS. 3–6.

Turning now to these FIGS. 3–6, it is shown how the bottom closure flaps are folded and interlocked to form the bottom closing structure of the present invention.

Thus, as seen in FIG. 3, which is the tubular portion shown in FIG. 2 inverted, the bottom closure flaps 29-32 are in a position ready to be folded so as to provide a locked closure at the bottom of the carton. The first step is to fold the first and second bottom flaps 29 and 30 over so that they overlap as seen in FIG. 4, these flaps being folded about their respective fold lines 59 and 69. In the configuration seen in FIG. 4, these flaps 29 and 30 are substantially perpendicular to the main panels 13-16 of the tubular body portion.

The next step includes folding of the third and fourth bottom flaps 31 and 32. As seen in FIG. 5, the third bottom flap 31 is folded about fold line 80, fold line 81 and fold line 82 so that the distal end portion 79 lies flat on the overlapped bottom flaps 29 and 30. From this position, the distal end portion 79 is maneuvered into slit 61 in flap 29 and also into slit 70 in flap 30, as seen in FIG. 6. In this configuration, the tab 67 associated with slit 61 overlies flap 31 and in addition tab 74 associated with slit 70 overlies flap 31 also. As seen in FIG. 6, the tapered distal end portion 79 is substantially completely received below those tabs and in the associated apertures with flap 31 being perpendicular to panel 14.

Similarly, the fourth bottom flap 32 is folded along fold lines 84, 86 and 87 so that the distal end portion 85 can be maneuvered into slit 60 associated with flap 29 and also slit 71 associated with flap 30. The intermediate position in which the distal end portion 85 is being slit into those apertures is shown in FIG. 5, the final locked position being shown in FIG. 6. In that FIG. 6 position, tab 64 associated with slit 60 in flap 29 overlies flap 32 and tab 77 associated with slit 71 in flap 30 overlies the flap 32 also with flap 32 being perpendicular to panel 16. Thus, the third flap 31 is received in one of the apertures 61 in the first set of apertures in flap 29 and is also received in one of the apertures 70 in the second set of apertures in flap 30. Similarly, the fourth flap 32 is received in the other of the apertures 60 in the first set in flap 29 and in the other of the apertures 71 in the second set of apertures in flap 30.

Since flaps 29 and 30 overlap one another, a very strong closure is formed. Since the flaps 31 and 32 are merely slid into the various apertures in flaps 29 and 30, the assembly and reassembly can simply be performed without a tearing or otherwise destruction of the carton itself.

Referring now to FIGS. 7-9, the steps necessary to close the top closure flaps of the carton of the present invention are shown.

Thus, in order to close the top of the carton, the first top flap 23 is first folded about its fold line 34 so that it is substantially perpendicular to the main panels 13-16, and then the second and third top flaps 24 and 25 are similarly folded along their respective fold lines 35 and 43 in an overlapping relationship with flap 23 and perpendicular to the main panels 13-16. This is shown in FIG. 7 in which the fourth top flap 26 is yet to be folded downwardly.

In order to manipulate this fourth top flap 26, it is first folded about the interior fold line 56, as seen in FIG. 8, and the locking tab 54 is maneuvered adjacent the slits 37 and 45 respectively located in flaps 24 and 25, as seen in FIG. 8.

Then, this locking tab 54 is maneuvered into these slits so that tab 40 associated with slit 37 overlies the locking tab 54 and tab 48 associated with slit 45 also overlies locking tab 54 with top flap being perpendicular to panel 13 and folded about fold line 50. As seen in FIG. 9, the rounded shoulders 52 and 53 on flap 26 are adjacent tabs 40 and 48 associated with slits 37 and 45.

Thus, the top portion of the carton is securely yet releasably closed and locked by means of the combination of the locking tab 54 and the slits 37 and 45. Removal of that locking tab will not tear or destroy the carton, thereby making the carton readily reusable.

While one advantageous embodiment has been chosen to illustrate the invention, it will be understood by those skilled in the art that various changes and modifications can be made therein without departing from the scope of the invention as defined in the appended claims. In particular, both sets of top closure flaps and bottom closure flaps need not be simultaneously used on a single carton. As used herein the term "slit" means an elongated, narrow aperture or opening. As seen in FIGS. 1-8, the L-shaped slits have a thickness or a width which is greater than if the slits were merely formed by thin, cut-lines made in the paperboard blank. However, these L-shaped slits could be formed by mere cut-lines, and yet provide a functioning self-locking carton as described herein.

What is claimed is:

1. A unitary paperboard blank adapted to form a carton comprising:

a front panel, a first side panel, a rear panel, a second side panel and a glue flap hingedly coupled in series along parallel fold lines; and four bottom closure flaps hingedly coupled to the bottoms of said panels along fold lines, said four bottom closure flaps comprising a first flap hingedly coupled to said rear panel and having a first set of two L-shaped slits therein, a second flap hingedly coupled to said front panel and having a second set of two L-shaped slits therein, and wherein each said L-shaped slit of said first and second flaps includes a first leg extending perpendicular to said fold lines hingedly coupling said first and second flaps to said rear and front panels, and a second leg extending perpendicular to said first leg, a third flap hingedly coupled to said first side panel, and a fourth flap hingedly coupled to said second side panel.

2. A blank according to claim 1, wherein
said third and fourth flaps each has two, parallel fold lines therein,
the first of said parallel fold lines being adjacent said fold lines hingedly coupling said third and fourth flaps to said first and second side panels,
the second of said parallel fold lines being adjacent the distal end of said third and fourth flaps.

3. A blank according to claim 1, wherein
said third and fourth flaps each has a tapered distal end.

4. A blank according to claim 1 wherein each of said first and second sets of L-shaped slits includes a first and second slit, with said first leg of said first slit being longer than said first leg of said second slit.

5. A blank according to claim 4, wherein
said second leg of said first slit extends towards said second slit, and
said second leg of said second slit extends towards said first slit.

6. A self-locking carton comprising:
a front panel, a first side panel, a rear panel, a second side panel and a glue flap hingedly coupled in series along parallel fold lines and folded to form a tubular body portion; and four bottom closure flaps hingedly coupled to the bottoms of said panels along fold lines and folded perpendicular to said panels in an overlapping configuration, said four bottom closure flaps comprising a first flap coupled to said rear panel and having a first set of two L-shaped apertures therein, a second flap coupled to said front panel and having a second set of two L-shaped apertures therein, and wherein each L-shaped aperture of each first and second flaps includes a first leg extending perpendicular to said fold lines hingedly coupling said first and second flaps to said rear and front panels, and a second leg extending perpendicular to said first leg, a third flap coupled to said first side panel and received in one of the apertures in said first set and one of the apertures in said second set, and a fourth flap coupled to said second side panel and received in the other of the apertures in said first set and the other of the apertures in said second set.

7. A blank according to claim 1 further including four top closure flaps hingedly coupled to the tops of said panels along fold lines, said four top closure flaps including a first top flap hingedly coupled to said rear panel, a second top flap hingedly coupled to said first side panel and having an L-shaped slit therein, a third top flap hingedly coupled to said second side panel having L-shaped slit therein, and a fourth top flap hingedly coupled to said front panel and having a locking tab at the end thereof.

8. A self-locking carton as recited in claim 6 further including four top closure flaps hingedly coupled to the tops of said panels along fold lines and folded perpendicular to said panels in overlapping configuration, said four top closure flaps including a first top flap coupled to said rear panel, a second top flap coupled to said first side panel and having an L-shaped aperture therein, a third top flap coupled to said second side panel and having an L-shaped aperture therein, and a fourth top flap coupled to said front panel and having a locking tab at the end thereof receivable in said L-shaped apertures in said second and third top flaps.

* * * * *